(12) United States Patent
Reddy et al.

(10) Patent No.: US 7,026,272 B2
(45) Date of Patent: Apr. 11, 2006

(54) METHODS AND COMPOSITIONS FOR SEALING OIL CONTAINING SUBTERRANEAN ZONES

(75) Inventors: B. Raghava Reddy, Duncan, OK (US); Gary P. Funkhouser, Duncan, OK (US); David L. Brown, Temple, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 433 days.

(21) Appl. No.: 10/385,975

(22) Filed: Mar. 11, 2003

(65) Prior Publication Data

US 2004/0180794 A1 Sep. 16, 2004

(51) Int. Cl.
C09K 7/02 (2006.01)
(52) U.S. Cl. .................. 507/237; 507/221; 507/231; 507/271; 166/292; 166/293; 166/295
(58) Field of Classification Search ............. 507/237, 507/221, 231, 271; 166/292, 293, 295
See application file for complete search history.

(56) References Cited

U.S. PATENT DOCUMENTS

| 5,514,645 A | 5/1996 | McCabe et al. ............ 507/238 |
| 5,913,364 A | 6/1999 | Sweatman .................. 166/281 |
| 6,060,434 A | 5/2000 | Sweatman et al. .......... 507/216 |
| 6,156,708 A | 12/2000 | Brookey et al. ............ 507/102 |
| 6,167,967 B1 | 1/2001 | Sweatman .................. 166/281 |
| 6,258,757 B1* | 7/2001 | Sweatman et al. .......... 507/219 |
| 6,511,944 B1 | 1/2003 | Taylor et al. ............... 507/237 |
| 2002/0165101 A1 | 11/2002 | Taylor et al. ............... 507/200 |
| 2003/0006037 A1 | 1/2003 | Brothers et al. ............ 166/292 |

FOREIGN PATENT DOCUMENTS

EP 0 875 658 A2 11/1998

OTHER PUBLICATIONS

Abstract No. XP-002282986 published Jun. 15, 1990.
Foreign communication from a related counterpart application dated Jun. 17, 2004. PCT/GB2004/000783.

\* cited by examiner

*Primary Examiner*—Kuo-Liang Peng
(74) *Attorney, Agent, or Firm*—Craig W. Roddy; McAfee & Taft

(57) ABSTRACT

The present invention provides methods and compositions for sealing subterranean zones containing oil to prevent the uncontrolled flow of fluids into or from the zones. The compositions basically comprise water, a phosphonic acid ester, a multivalent metal ion releasing compound and an organophilic clay.

41 Claims, No Drawings

METHODS AND COMPOSITIONS FOR SEALING OIL CONTAINING SUBTERRANEAN ZONES

BACKGROUND OF THE INVENTION

1. Field of the Invention

The present invention relates to improved methods and compositions for sealing oil containing subterranean zones penetrated by well bores.

2. Description of the Prior Art

In the drilling of oil and gas wells using the rotary drilling method, drilling fluid is circulated through the drill string and drill bit and then back to the surface by way of the well bore being drilled. The drilling fluid maintains hydrostatic pressure on the subterranean zones through which the well bore is drilled and circulates cuttings out of the well bore. During such drilling, subterranean vugs, fractures and other thief zones are often encountered whereby the drilling fluid circulation is lost and drilling operations must be terminated while remedial steps are taken. Also, when a subterranean zone is penetrated containing fluids under pressure which exceeds the hydrostatic pressure exerted on the zone by the drilling fluid, formation fluid cross-flows and/or underground blowouts can and often do occur.

Heretofore, a variety of compositions have been developed and used for combating lost circulation, cross-flow and underground blow-out problems. However, such compositions have often been unsuccessful due to delayed and inadequate viscosity development by the compositions. For example, a variety of compositions containing hydraulic cement or the like have been used in attempts to stop lost circulation. The lost circulation is usually the result of encountering weak subterranean zones that contain natural fractures or are fractured by drilling fluid pressures and rapidly break down. When a cement or other slow setting composition is squeezed into the zone, the delay in developing high viscosity allows the cement composition to be diluted and displaced into the zone whereby it by-passes the fractures and vugs causing the lost circulation. The same type of problem often occurs when cross-linked hydrated gels and other similar plugging compositions are utilized.

More recently, water-based compositions for sealing subterranean zones and methods have been developed for sealing subterranean zones containing water-based or oil-based drilling fluids. The compositions for sealing subterranean zones containing oil-based drilling fluids are basically comprised of water, an aqueous rubber latex, an organophilic clay, and other components. When such a sealing composition is pumped into a subterranean zone and contacts oil-based fluids therein, the composition viscosities to a thick mass very quickly and plugs fractures, vugs and other thief zones in the subterranean zone. A problem sometimes encountered in the use of the above described sealing composition is that the mixture can solidify prematurely prior to contacting oil-based fluids in the subterranean zone to be sealed. Additionally, the aqueous rubber latex and the latex stabilizing surfactants utilized in the sealing composition are costly and make the use of the sealing composition expensive.

Thus, there is a need for improved methods and compositions for sealing subterranean zones that develop high viscosity in a few seconds or minutes and are relatively inexpensive to use.

SUMMARY OF THE INVENTION

Improved methods and water-based sealing compositions are provided which overcome the deficiencies of the prior art and meet the needs described above. The methods and compositions are particularly suitable for sealing subterranean zones containing oil such as oil-based drilling fluids, e.g., water-in-oil emulsions.

The methods of the invention are basically comprised of the following steps. A subterranean zone sealing composition of this invention is provided comprising water, a phosphonic acid ester of the formula

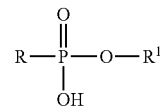

wherein R is an alkyl group having from about 8 to about 24 carbon atoms and $R^1$ is an alkyl group having from about 1 to about 4 carbon atoms, a multivalent metal ion releasing compound wherein the multivalent metal ion has a charge of +3 or greater, and an organophilic clay. Thereafter, the sealing composition is introduced into the subterranean zone.

When the sealing composition contacts oil, an oil-based drilling fluid or other form of oil, it rapidly forms a viscous mass which flows into and plugs subterranean fractures, vugs and other thief zones whereby the uncontrolled flow of fluids into or from the subterranean zone is terminated.

The sealing composition can also include an oil swellable elastomer therein for providing delayed additional viscosity.

A sulfur cross-linking agent can also be added to the composition to cross-link the elastomer and increase the viscosity further.

The sealing compositions of the invention basically comprise water, a phosphonic acid ester of the formula

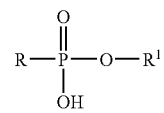

wherein R is an alkyl group having from about 8 to about 24 carbon atoms and $R^1$ is an alkyl group having from about 1 to about 4 carbon atoms, a multivalent metal ion releasing compound wherein the multivalent metal ion has a charge of +3 or greater, and an organophilic clay.

The objects, features and advantages of the present invention will be readily apparent to those skilled in the art upon a reading of the description of preferred embodiments which follows.

DESCRIPTION OF PREFERRED EMBODIMENTS

As mentioned above, in the drilling of wells, subterranean zones are often encountered which contain high incidences of natural vugs and fractures. As a result, drilling fluid circulation is often lost which requires the termination of the drilling and the implementation of remedial procedures which are often of long duration and high cost.

The present invention provides improved methods and compositions for sealing a subterranean zone containing oil to prevent the uncontrolled flow of fluids into or from the zone. The term "oil" is used herein to mean various oils such as crude oil, diesel oil, kerosene and the like as well as oil based fluids and organic fluids. The methods and compositions are particularly suitable for use in wells containing oil-based drilling fluids. When a sealing composition of this invention contacts an oil-based drilling fluid, it instantly forms a high viscosity mass. As the sealing mass is displaced through the well bore penetrating that subterranean zone, it enters and seals fractures, vugs and thief zones through which fluid is lost. The sealing composition is self-diverting and plugs multiple weak zones in a single well treatment. When a well contains a cross-flow or underground blow-out, the high viscosity sealing composition plugs all the lower pressure weak zones penetrated by the well bore and as the pressure in the well bore is increased, the cross-flow or blow-out zone is also plugged.

The sealing compositions of the present invention basically comprise water, a phosphonic acid ester of the formula

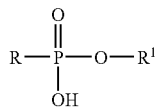

wherein R is an alkyl group having from about 8 to about 24 carbon atoms and $R^1$ is an alkyl group having from about 1 to about 4 carbon atoms, a multivalent metal ion releasing compound wherein the multivalent metal ion has a charge of +3 or higher, and an organophilic clay.

The water in the sealing composition can be fresh water or salt water. However, the salts in the salt water should be salts that do not react with the multivalent metal ion and thereby prevent the multivalent metal ion from reacting with the phosphonic acid ester. Generally, the water is present in the sealing composition in an amount in the range of from about 85% to about 99% by weight of the aqueous composition, more preferably in the range of from about 90% to about 99% and most preferably about 98%.

As previously indicated, the phosphonic acid ester useful in accordance with this invention is of the formula

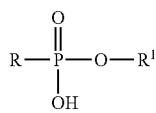

wherein R is an alkyl group having from about 8 to about 24 carbon atoms and $R^1$ is an alkyl group having from about 1 to about 4 carbon atoms. Preferably, R of the phosphonic acid ester is decyl and $R^1$ is methyl. The phosphonic acid ester utilized is included in the sealing composition in an amount in the range of from about 0.5% to about 5% by weight of the aqueous composition, more preferably in an amount in the range of from about 1% to about 3% and most preferably about 2%.

The multivalent metal ions which are suitable for reacting with the phosphonic acid ester are those ions having a charge of +3 or greater. Particularly suitable multivalent metal ions include, but are not limited to, ferric ion, aluminum ion, cobalt ion, cerium ion, chromium ion and vanadium ion. The multivalent ion utilized is added to the sealing composition in the form of a multivalent metal ion-releasing compound. Examples of multivalent metal ion-releasing compounds suitable for use in accordance with the present invention include, but are not limited to, aluminum chloride, ferric sulfate, ferric chloride, chromium chloride and amine complexes of the multivalent ions. Of these, amine complexes of iron (+3) ion are preferred. Suitable amine complexes of iron (+3) are prepared by reacting a soluble source of ferric ion such as ferric sulfate with a $C_8$–$C_{18}$ surface-active amine in the presence of an organic solvent such as a $C_2$–$C_4$ monohydric alcohol. The surface-active amine employed can include $C_8$–$C_{18}$ alkyl and alkanol amines, $C_8$–$C_{18}$ alkyl substituted derivatives of N-heterocyclics and mixtures thereof. A more detailed description of such amine complexes of iron (+3) is set forth in U.S. Pat. No. 5,514,645 issued to McCabe et al. on May 7, 1996 which is incorporated herein by reference thereto. The multivalent metal ion-releasing compound utilized is included in the composition in a metal ion to phosphonate molar ratio in the range of from 1:5 to 1:1, preferably 1:3. The weight percent of the metal ion-releasing compound in the composition depends on the structure and molecular weight of the metal ion-releasing compound. For example, when iron (+3) sulfate is used, the weight % of the compound in the composition will range from 0.18% to 9.6%.

While a variety of organophilic clays can be utilized, an alkyl quaternary ammonium bentonite clay is preferred for use in accordance with the present invention. A particularly suitable alkyl quaternary ammonium bentonite clay is commercially available from Southern Products, Inc. of Gonzales, Tex. under the trade designation "CLAYTONE-II™." The organophilic clay is generally present in the sealing composition of this invention in an amount in the range of from about 5% to about 60% by weight of the composition, more preferably in an amount of about 10% to about 50% and most preferably 25%.

In some applications, the sealing composition of this invention as described above does not produce a viscous mass strong enough to plug relatively large fractures, thief zones and the like. In order to increase the strength of the viscous mass formed in those applications, an oil swellable elastomer can be included in the sealing composition. When in contact with oil, the elastomer swells and increases the sealing composition viscosity at a slower rate than the initial viscosity increase of the composition.

Examples of oil swellable elastomers that can be utilized include, but are not limited to, styrene-butadiene elastomer, styrene-butadiene-styrene elastomer, acrylonitrile-styrene-butadiene elastomer, ethylene-propylene-diene elastomer and mixtures thereof. Of these, styrene-butadiene elastomer is preferred. When used, the elastomer is included in the sealing composition in an amount in the range of from about 5% to about 40% by weight thereof.

When even more viscosity is required, a cross-linking agent, typically referred to as vulcanizing agents, for cross-linking the elastomer can be included in the sealing composition. Examples of such cross-linking agents include, but are not limited to, sulfur, organic peroxide compounds, azo compounds, phenolic curatives, benzoquinone derivatives, bismaleimides, selenium, tellurium, resins, metal oxides and organic sulfur compounds such as alkyl thiuram. A particularly suitable such cross-linking agent is sulfur. When used, the cross-linking agent is included in the sealing composition in an amount in the range of from about 2% to about 5% by weight of the elastomer.

Additives which moderate the rate of cross-linking may also be added. Such additives include vulcanization activators such as zinc oxide and stearic acid and its alkali and alkaline earth metal salts, and vulcanization retarders such as salicylic acid, sodium acetate, phthalic anhydride and N-cyclohexyl thiophthalimide.

A preferred method of this invention for sealing a subterranean zone containing oil to prevent the uncontrolled flow of fluids into or from the zone comprises the steps of: (a) providing a subterranean zone sealing composition comprising water, a phosphonic acid ester of the formula

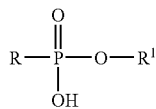

wherein R is an alkyl group having from about 8 to about 24 carbon atoms and $R^1$ is an alkyl group having from about 1 to about 4 carbon atoms, a multivalent metal ion releasing compound wherein the multivalent metal ion has a charge of +3 or greater and an organophilic clay; and (b) introducing the sealing composition into the subterranean zone.

A preferred composition of this invention for sealing a subterranean zone containing oil to prevent the uncontrolled flow of fluids into or from the zone comprises: water; a phosphonic acid ester of the formula

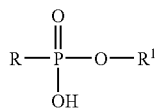

wherein R is an alkyl group having from about 8 to about 24 carbon atoms and $R^1$ is an alkyl group having from about 1 to about 4 carbon atoms; a multivalent metal ion releasing compound wherein the multivalent metal ion has a charge of +3 or higher; and an organophilic clay.

A more preferred composition of this invention for sealing a subterranean zone containing oil to prevent the uncontrolled flow of fluids into or from the zone comprises: water; a phosphonic acid ester of the formula

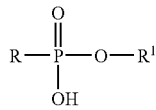

wherein R is decyl and $R^1$ is methyl; a multivalent metal ion releasing compound comprising an amine complex of iron (+3) ion; and an alkyl quaternary ammonium bentonite clay.

Generally, a sealing composition of this invention is prepared in mixing apparatus at the surface and then pumped down the well bore by way of the drill string or a work string into a subterranean zone to be sealed containing oil, oil based fluids or organic fluids. In an alternate procedure, the oil, oil based fluids or organic fluids can be pumped on the outside of the drill string or work string with the sealing composition being pumped through the inside of the drill string or work string. The pumping is at a pressure whereby upon the mixing of the two streams, the sealing masses formed in the subterranean zone are squeezed into fractures, vugs and thief zones. A fluid pressure above the fracture gradient can also be used in some applications to fracture the subterranean zone being sealed and force the sealing masses into the fractures thereby increasing the overall strength of the subterranean zone. As mentioned, the sealing composition masses enter the weakest portions of the subterranean zone first, followed by other portions including those where fluids cross-flow through the well bore or blowout into the well bore. The sealing composition masses stop drilling fluid losses and allow high drilling fluid densities to be utilized when needed while drilling. Once the sealing composition masses have been placed, they increase the fracture gradient to a higher value that can eliminate the need for intermediate casing, liners and the like. Because the sealing composition masses readily divert to other weak zones in the well bore, the integrity of the entire well bore is improved by the sealing composition.

In order to further illustrate the methods and compositions of this invention, the following examples are given.

EXAMPLE 1

A Hassler Sleeve setup typically used for fluid flow through cores was chosen for the purpose of this example. A 4.2" long Berea core was fractured along the length of the core and dried in an oven overnight. Small strips of metal spacers of 1 mm thick were placed at points along the two sides of the core. The gaps between the spacer strips were filled with a mixture of sand and epoxy resin, and the outside surface of the assembled core was coated with epoxy glue. The epoxy glue was allowed to cure for at least 6 hrs.

The core was placed in the Hassler rubber sleeve. An overburden pressure, generally 300–500 psi higher than the mud pressure, was exerted on the rubber sleeve. A back pressure of 110 psi was applied on the core. The bottom end of the core was connected to a reservoir containing the base oil. Initially, the core assembly was connected to a separate vessel which was quickly charged with a freshly prepared mixture of a sealing composition of this invention and oil-based mud (drilling fluid) mixture (mud to sealing composition volume ratio, 1:1), and the mixture was forced to extrude through the fracture under nitrogen pressure at room temperature. The mixture was fluid enough immediately after mixing to extrude through the fracture. The oil based mud was comprised of an external phase comprising a base fluid which was a mixture of organic esters and internal olefins, a polyaminated fatty acid emulsifier, a filtration controlling copolymer, a modified fatty acid suspension agent/viscosifier, an internal aqueous phase containing about 35% calcium chloride and the solids added thereto were barium sulfate. The density of the mud was 15.6 pounds per gallon. The core was disconnected from the vessel containing the sealing composition/mud mixture, removed from the rubber sleeve, and cleaned of any residual sealing composition/mud mixture on the face. The residual sealing composition/mud mixture in the lines was flushed with mud and the core chamber was connected into the flow loop. The mud was allowed to flow until it contacted the front face of the core. The reservoir and the core assembly were heated to 180° F. Upon reaching 180° F., the core was held at that temperature for a specified period. The pressure on the mud was increased gradually at 5 minute intervals. When the pressure reached maximum value, it was held at that value for 30 minutes. During the pressure increase, any flow of fluid through the core was measured by collecting the effluent.

The following Table lists all the treatment systems tested and the results obtained.

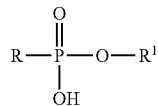

TABLE

| Experiment No. | Sealing Composition Tested | Oil[1] Based Mud With Solids | Oil Based Mud Without Solids | Fracture Width, mm | Cure Time at 180° F. | Pressure at Fluid Flow Through Core, psi | Volume of Fluid Collected, ml/min. | Maximum Pressure Attained, psi |
|---|---|---|---|---|---|---|---|---|
| 1 | Present Invention | Yes | — | 1 | 30 min. | 1950 | 20.6/135 | 1830 |
| 2 | Commercial[2] Sealing Composition | — | Yes | 1 | 30 min. | 1700 | 7.8/54 | 2030 |
| 3 | Commercial[3] Sealing Composition | Yes | — | 1 | 30 min. | No Fluid Flow | 0 | 1940 |

[1]Solids were added to mud in an equal volume to the mud
[2]Without solids a creamy fluid was obtained which did not solidify at 180° F. for several hours
[3]The formulation was same as in Experiment #2. The core was pretreated by flowing mud (30 ml at 10 ml/min.) prior to treatment The sealing composition of the present invention was tested in Experiment No. 1. The sealing composition included water, the phosphonic acid ester of this invention wherein R was decyl and $R^1$ was methyl in an amount of 2% by volume of the water, an amine complex of iron (+3) in an amount of 2% by volume of water and an alkyl quaternary ammonium bentonite clay in an amount of 25% by weight of the composition. The aqueous sealing composition mixture was held at a pressure up to 1950 psi before fluid flow was observed. Upon mixing with the mud, the sealing composition with sealing composition viscosified very quickly.

EXAMPLE 2

To a sample of 100 ml of the oil-based drilling fluid used in Example 1, about 20 grams of a styrene-butadiene block polymer supplied by Atofina Elastomers, Inc. of Houston, Tex. under the trade name FINAPRENE™ which had been ground to a particle size of approximately 200–400 microns was added and allowed to stand at room temperature. In about 3 hrs, the entire fluid mass became a rubbery, non-flowing mass. When the drilling fluid was replaced by either the base fluid used in the drilling fluid or kerosene, a similar result was obtained.

Thus, the present invention is well adapted to carry out the objects and attain the benefits and advantages mentioned as well as those which are inherent therein. While numerous changes in the compositions and methods can be made by those skilled in the art, such changes are encompassed within the spirit of this invention as defined by the appended claims.

What is claimed is:

1. A method of sealing a subterranean zone comprising the steps of:
  (a) providing a subterranean zone sealing composition which quickly forms a viscous sealing mass when in contact with oil, said sealing composition comprising water, a phosphonic acid ester of the formula wherein R is an alkyl group having from about 8 to about 24 carbon atoms and $R^1$ is an alkyl group having from about 1 to about 4 carbon atoms, a multivalent metal ion releasing compound wherein the multivalent metal ion has a charge of +3 or greater and an organophilic clay; and
  (b) introducing said sealing composition into said subterranean zone.

2. The method of claim 1 wherein said water is selected from the group consisting of fresh water and salt water.

3. The method of claim 1 wherein said water has a pH equal to or less than about 6.

4. The method of claim 1 wherein said water is present in said composition in an amount in the range of from about 85% to about 99% by weight thereof.

5. The method of claim 1 wherein said phosphonic acid ester is present in said composition in an amount in the range of from about 0.5% to about 5% by weight thereof.

6. The method of claim 1 wherein said multivalent metal ion releasing compound is selected from the group consisting of aluminum chloride, ferric sulfate, ferric chloride, chromium chloride and amine complexes of iron (+3).

7. The method of claim 1 wherein said multivalent metal ion releasing compound is present in said composition in a metal ion to phosphonate molar ratio in the range of from 1:5 to 1:1.

8. The method of claim 1 wherein said organophilic clay is an alkyl quaternary ammonium bentonite clay.

9. The method of claim 1 wherein said organophilic clay is present in said composition in an amount in the range of from about 5% to about 60% by weight thereof.

10. The method of claim 1 wherein said sealing composition further comprises an oil swellable elastomer therein.

11. The method of claim 10 wherein said oil swellable elastomer is selected from the group consisting of styrene-butadiene elastomer, styrene-butadiene-styrene elastomer, acrylonitrile-styrene-butadiene elastomer, ethylene-propylene-diene elastomer and mixtures thereof.

12. The method of claim 10 wherein said oil swellable elastomer is styrene-butadiene elastomer.

13. The method of claim 10 wherein said oil swellable elastomer is present in said composition in an amount in the range of from about 5% to about 40% by weight thereof.

14. The method of claim 10 wherein said sealing composition further comprises a cross-linking agent for cross-linking said oil swellable elastomer.

15. The method of claim 14 wherein said cross-linking agent is sulfur.

16. The method of claim 14 wherein said cross-linking agent is present in said composition in an amount in the range of from about 2% to about 5% by weight of said elastomer in said composition.

17. A method of sealing a subterranean zone comprising the steps of:
(a) providing a subterranean zone sealing composition which quickly forms a viscous sealing mass when in contact with oil, said sealing composition comprising water, a phosphonic acid ester of the formula

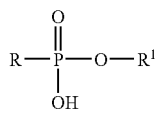

wherein R is decyl and R$^1$ is methyl, a multivalent metal ion releasing compound comprising an amine complex of iron (+3), and an alkyl quaternary ammonium bentonite clay; and
(b) introducing said sealing composition into said subterranean zone.

18. The method of claim 17 wherein said water is present in said composition in an amount in the range of from about 85% to about 99% by weight thereof.

19. The method of claim 17 wherein said phosphonic acid ester is present in said composition in an amount in the range from about 0.5% to about 5% by weight thereof.

20. The method of claim 17 wherein said multivalent metal ion releasing compound is present in said composition in a metal ion to phosphonate molar ratio in the range of from 1:5 to 1:1.

21. The method of claim 17 wherein said alkyl quaternary ammonium bentonite clay is present in said composition in an amount in the range of from about 5% to about 60% by weight thereof.

22. The method of claim 17 wherein said sealing composition further comprises an oil swellable styrene-butadiene elastomer therein.

23. The method of claim 22 wherein said oil swellable styrene-butadiene elastomer is present in said composition in an amount in the range of from about 5% to about 40% by weight thereof.

24. The method of claim 22 wherein said sealing composition further comprises a sulfur cross-linking agent for cross-linking said styrene-butadiene elastomer.

25. The method of claim 24 wherein said sulfur cross-linking agent is present in said composition in an amount in the range of from 2% to about 5% by weight of said elastomer therein.

26. A composition for sealing a subterranean zone comprising:
water;
a phosphonic acid ester of the formula

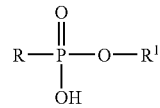

wherein R is an alkyl group having from about 8 to 24 carbon atoms and R$^1$ is an alkyl group having from about 1 to about 4 carbon atoms;
a multivalent metal ion releasing compound wherein the multivalent metal ion has a charge of +3 or higher; and
an organophilic clay.

27. The composition of claim 26 wherein said water is selected from the group consisting of fresh water and salt water.

28. The composition of claim 26 wherein said water has a pH equal to or less than about 6.

29. The composition of claim 26 wherein said water is present in an amount in the range of from about 85% to about 99% by weight of said composition.

30. The composition of claim 26 wherein said phosphonic acid ester is present in an amount in the range of from about 0.5% to about 5% by weight of said composition.

31. The composition of claim 26 wherein said multivalent metal ion releasing compound is selected from the group consisting of aluminum chloride, ferric sulfate, ferric chloride, chromium chloride and amine complexes of iron (+3).

32. The composition of claim 26 wherein said multivalent metal ion releasing compound is present in a metal ion to phosphonate molar ratio in the range of from 1:5 to 1:1.

33. The composition of claim 26 wherein said organophilic clay is an alkyl quaternary ammonium bentonite clay.

34. The composition of claim 26 wherein said organophilic clay is present in an amount in the range of from about 5% to about 60% by weight of said composition.

35. The composition of claim 26 which further comprises an oil swellable elastomer.

36. The composition of claim 35 wherein oil swellable elastomer is selected from the group consisting of styrene-butadiene elastomer, styrene-butadiene-styrene elastomer, acrylonitrile-styrene-butadiene elastomer, ethylene-propylene-diene elastomer and mixtures thereof.

37. The composition of claim 35 wherein said oil swellable elastomer is styrene-butadiene elastomer.

38. The composition of claim 35 wherein said oil swellable elastomer is present in an amount in the range of from about 5% to about 40% by weight of said composition.

39. The composition of claim 35 which further comprises a cross-linking agent for cross-linking said oil swellable elastomer.

40. The composition of claim 39 wherein said cross-linking agent is sulfur.

41. The composition of claim 39 wherein said cross-linking agent is present in an amount in the range of from about 2% to about 5% by weight of said elastomer in said composition.

* * * * *